Oct. 25, 1966 W. W. BUECHNER 3,280,694
PHOTOGRAPHIC EASEL
Filed Sept. 16, 1963 4 Sheets-Sheet 1

INVENTOR.
Werner W. Buechner

Oct. 25, 1966
W. W. BUECHNER
3,280,694
PHOTOGRAPHIC EASEL
Filed Sept. 16, 1963
4 Sheets-Sheet 2
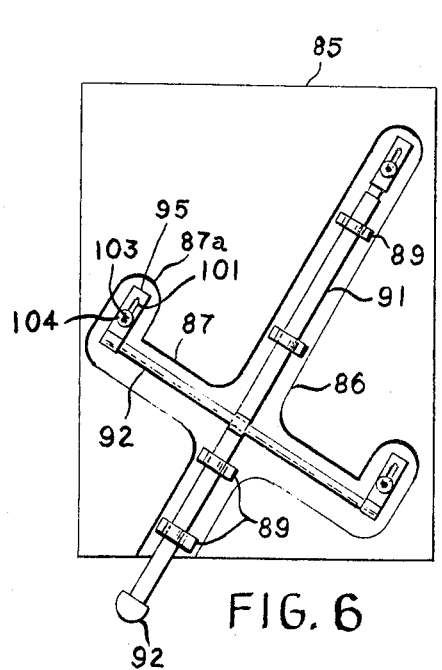
FIG. 6
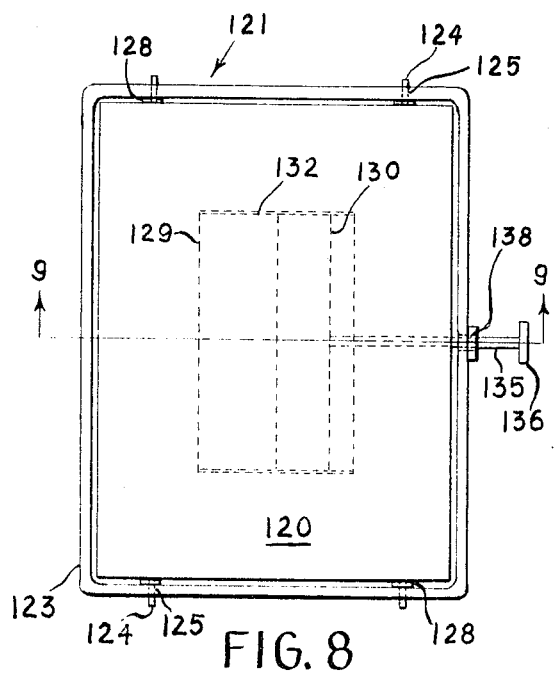
FIG. 8
FIG. 9
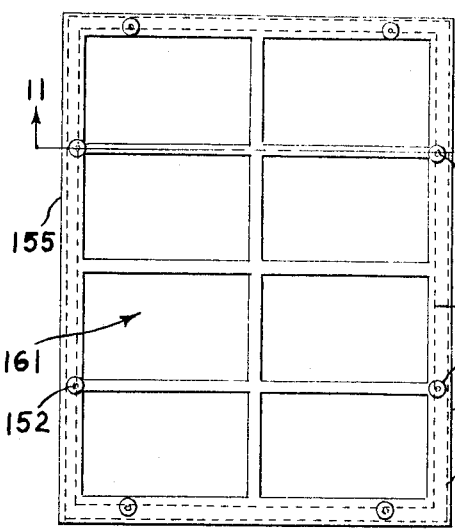
FIG. 10
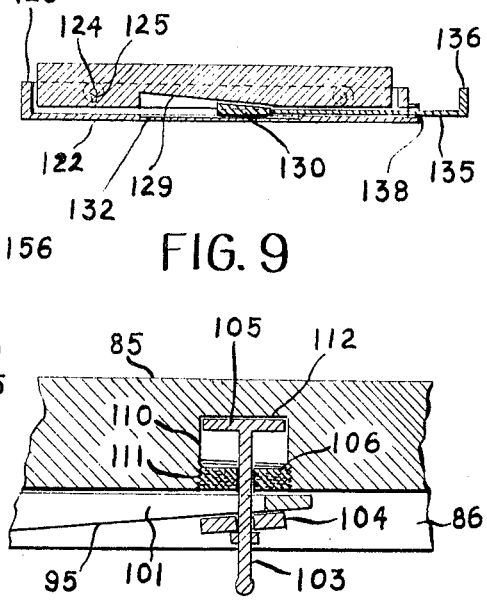
FIG. 7
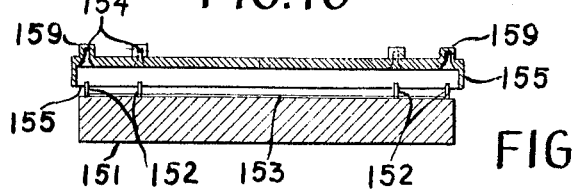
FIG. 11
INVENTOR.
Werner W. Buechner

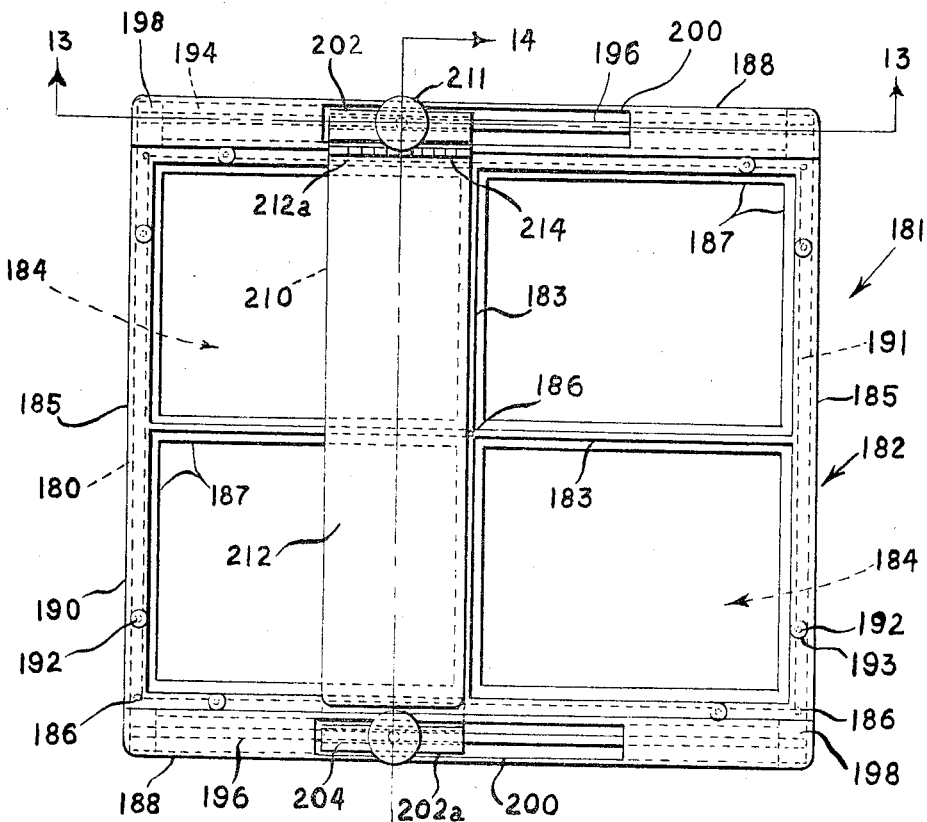
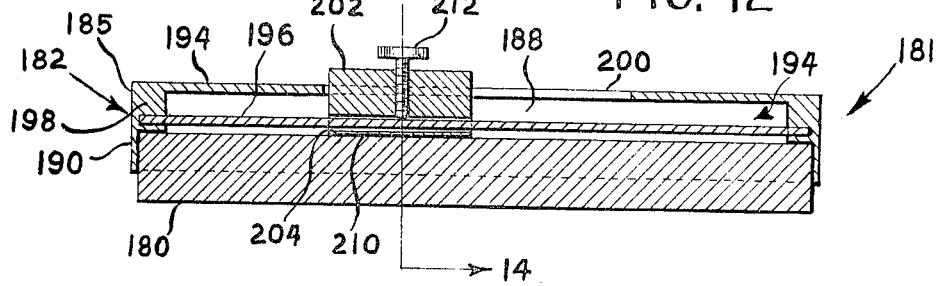
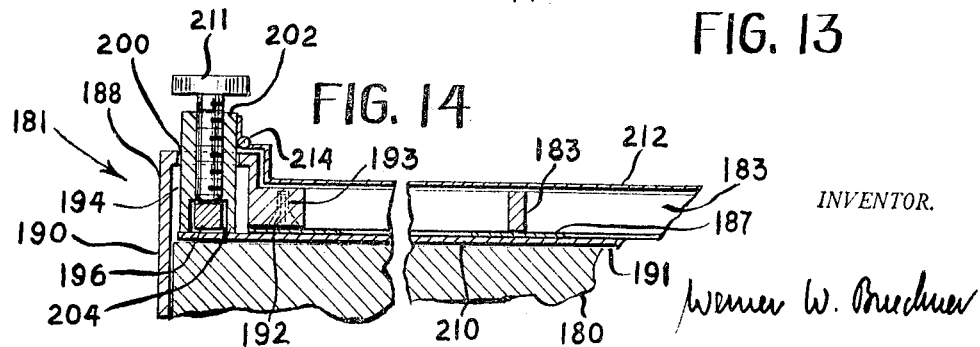
INVENTOR.
Werner W. Buechner

Oct. 25, 1966 W. W. BUECHNER 3,280,694
PHOTOGRAPHIC EASEL

Filed Sept. 16, 1963 4 Sheets-Sheet 4

INVENTOR.
Werner W. Buechner

United States Patent Office 3,280,694
Patented Oct. 25, 1966

3,280,694
PHOTOGRAPHIC EASEL
Werner W. Buechner, 4407 Gladding Court,
Midland, Mich.
Filed Sept. 16, 1963, Ser. No. 309,199
31 Claims. (Cl. 88—24)

This invention relates to novel photographic easel and more particularly to a multiexposure easel.

It is an object of the present invention to provide a photographic easel, which permits the production of a multiplicity of photographic prints on one standard sheet, such that each print in surrounded by a complete, unexposed border or margin of any desired width.

It is another object of the present invention to provide a photographic easel, which permits the successive composition, focussing and exposure of a multiplicity of different images on one standard sheet contained in the easel.

It is a further object, to provide an easel, which is adapted to produce directly on photographic reversal materials positive transparencies or prints, having transparent or white margins or borders.

It is still another object of the invention, to provide a multiexposure easel, which permits individual cropping of each of a multiplicity of prints exposed on a common sheet of photographic material.

Other objects will become apparent from the following detailed description of the invention and from the accompanying drawings.

Generally, the objects of the invention are accomplished by the provision of a photographic easel, which comprises a base and, removably superimposed thereon, a masking frame, said base being adapted to receive a standard sheet of light sensitive photographic material and said masking frame comprising a multiplicity of picture areas and means, adapted to be removably inserted into the picture areas, so as to protect the underlying sheet of photographic material from unintentional exposure to light.

The invention comprises also an easel, which is provided with means permitting controlled vertical height adjustment of the easel. Another embodiment of the easel of the invention comprises a masking frame, made from a material which is pervious to light and preferably made from a transparent material. The invention further comprises an embodiment of the easel, in which the base or the masking frame or both are provided with means, adapted to permit cropping of the individual picture areas.

Further embodiments and modifications of the easel will be described in the following detailed description of the invention and in the accompanying drawings, wherein:

FIG. 6 is a bottom plan view of a base, having means for controlled height adjustment, useful in the easel of the invention, and FIG. 7 is an enlarged fragmentary section of a detail view of the means for height control.

FIG. 8 is a top plan view and FIG. 9 is a vertical sectional view, taken along lines 9—9 of FIG. 8 of another embodiment of the height adjustable base.

FIG. 10 depicts a top plan view and FIG. 11 a vertical section, taken along line 11—11 in FIG. 10 of an embodiment of the easel of the invention, having eight individual picture areas and combined centering and registering means.

FIG. 12 shows a top plan view and FIG. 13 a vertical section, taken along line 13—13 on FIG. 12 of an embodiment of the easel of the invention, having means for cropping.

FIG. 14 is a fragmentary vertical section of a portion of the easel of FIG. 12, taken along line 14—14 in FIGS. 12 and 13.

Figure 1:
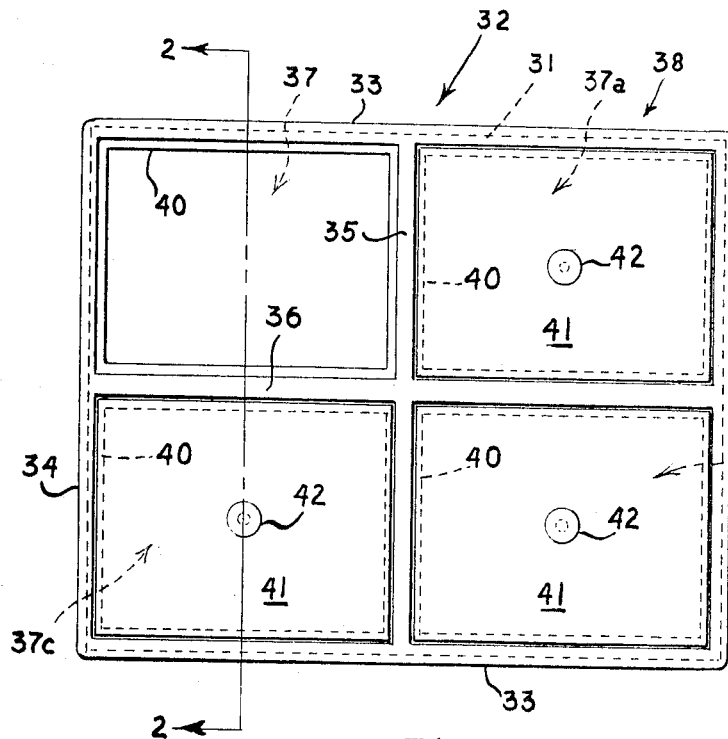
FIG. 1 is a top plan view and FIG. 2 is a vertical sectional view, taken along line 2—2 in FIG. 1 of a multiexposure easel, comprising four picture areas.

The novel easel of the present invention is useful in any desired photographic process, which entails the production of a latent image on a light sensitive photographic material by exposure in an enlarger. The multiexposure easel may be used with particular advantage in combination with the apparatus and processes described and claimed in my copending applications Ser. No. 23,313, filed April 19, 1960, Ser. No. 52,524, filed August 29, 1960 and Ser. No. 302,902, filed August 19, 1963.

The term "light sensitive photographic material" encompasses any type of photographic material, which is adapted to produce a latent image upon exposure with a line, continuous tone or pictorial representation, and capable of rendering an actual representation by suitable aftertreatment and finishing procedures. Examples of such light sensitive materials are the black and white and color materials, contained on an opaque or transparent base, which are adapted to produce a positive image, directly by exposure from a negative representation or indirectly by reversal techniques, when they are exposed from a positive representation. The term includes also such materials, which are adapted to render a negative representation or image, directly by exposure from a positive representation, or indirectly by exposure from a negative with the application of reversal techniques. In short, the term comprises all those photographic sheet materials, which are adapted to be exposed in an enlarger, or which are customarily handled by exposure in an enlarger.

The expression "standard sheet" as used herein, is intended to refer to the maximum size of sheet, for which the easel is designed. If no special centering means are used, the size of the standard sheet is preferably approximately equal to or slightly smaller than the size of the base or the area, defined by the masking frame, respectively. If centering means are provided on the base or in the masking frame, the size of the standard sheet corresponds approximately to the size and dimension, outlined and defined by said centering means. It need not be mentioned, that the easel is adapted to handle sheets of a size smaller than that of the standard sheet, though the advantages of the easel are best realized, if it is used with the standard sheets.

By designing the holding or carrier means, used in the apparatus and device, employed for the treatment and/or finishing of the exposed photographic material, specifically for the handling of the standard sheet, the operator needs to purchase only one size of equipment, and handles only one size of sheet material with the accompanying advantages and economy, without foregoing the possibility of producing finished prints and representations of any desired size, whereby each print is surrounded by a full white or transparent border or margin of any desired width.

The term "picture area" is used to designate the direct opening in the masking frame, disregarding any masking means provided within this area, which will determine the approximate size and shape of the individual representations to be produced in the easel of the invention. The picture areas may be square, rectangular, circular or oval, or they may have any other desired shape. The picture areas in a given masking frame may be of identical size and shape, or differently sized and/or shaped picture areas may be combined in one masking frame, so as to permit the production of a multiplicity of identically dimensioned prints or an assortment of differently dimensioned prints on one standard sheet.

The expression "useable picture area" is intended to means the actual opening, defined within the picture area by suitable masking means, if such are present or used in the masking frame. In the absence of special masking means, the picture area and useable picture area are identical.

The term "print" as used herein, designates any representation, which may be produced by photographic means and procedures, including a light exposure in an enlarger on light sensitive photographic sheet materials. The term refers specifically to the representation, produced in each individual picture area. The exposed and finished standard sheet of photographic material will thus, with the use of the multiexposure easel of the present invention, contain a multiplicity of prints, before it is cut, if the multipicture area masking frame is used in the easel.

As is apparent from the foregoing, the novel device of the present invention is of primary utility in the making of enlargements or reductions from color negatives, such as those produced on commercially available negative materials, which are in form of precut sheets, plates, roll film, movie film etc. Representative of these materials are those sold under the trade names: "Kodacolor," "Ektacolor," "Agfacolor," and many others.

The device may likewise and with equal ease be used for the production of enlargements or reductions from images contained on transparent sheets or strips of the various so-called color positive materials. Representative of these are the products sold commercially under the trade names "Ektachrome," "Kodachrome," "Agfachrome," "Anscochrome," etc. The device will permit with equal ease the making of negative and of positive prints or transparencies from representations on these positive color materials, if the sheets of the appropriate color materials are used in the easel of the invention.

The novel easel of the invention may likewise be used for the making of enlargements or reductions from black and white, or colored negative or positive representations on black and white positive printing materials or reversal materials, respectively. Its use for these materials, the same as for the above noted color materials is however only recommended, if development and aftertreating of these materials are standardized and carried out under conditions, which permit the obtention of predictable, reproducible results. By proper control and standardization of the conditions for the making of the negative or positive images to be printed and by exacting determination of the exposure in the making of the enlargement or reductions in the multiexposure easel of the present invention, also black and white materials may be handled with the greatest satisfaction.

The easel of the present invention offers not only the advantage, that a multiplicity of prints may be produced on one standard sheet, each print being surrounded by a white or transparent, unexposed border or margin. If desired, each print may also be provided with a black or non-reflectant, or with a light-impervious border or margin, as may be desired, in the production of positive transparencies, where a transparent print, having light-impervious borders or margins, is usually preferred. This may be achieved by the use of the transparent masking frame, described hereinafter in detail, when making positive transparencies from negatives, with a separate white light exposure of the border or margin areas. In the production of positive transparencies directly from positive transparencies on reversal materials, the use of the light-impervious masking frame will likewise produce the black or light impervious borders or margins in the finished duplicate transparencies.

Figure 2:
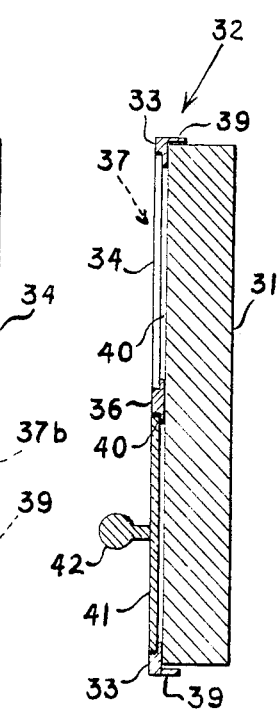

The multiexposure easel of the present invention depicted in FIGS. 1 and 2 of the accompanying drawings, comprises rectangular base 31 and rectangular masking frame 32, of a size slightly larger than base 31, and removably set on the base. Masking frame 32 is principally made up of a pair of long edge members 33 and of a pair of short edge members 34, which are joined at right angles to form rectangular frame 38. Cross bar 35 is joined to and extends between the centers of edge members 33, and cross bar 36 is joined to and extends between the centers of short edge members 34, so as to define four rectangular picture areas 37, 37a, 37b and 37c of identical size and shape. Frame 38 extends downwardly to form all around its outer edge rim 39, which is adapted to fit removably over the upper edges of base 31, when the masking frame is inserted thereon. Within each of the picture areas are joined to the lower edges of the half sections of the edge members 33 and 34 and of the cross bars 35 and 36, which together define the picture areas 37–37c, flat strip members, which together form rectangular masks 40 all around the inner edges of each of the picture areas, leaving a useable open area or a useable picture area somewhat smaller than the picture areas 37–37c. The lower edges of masks 40 are located in the common plane defined by the lower edges of cross bars 35 and 36 and edge members 33 and 34, such that the underside of the masking frame exclusive of the projecting rim 39, defines one plane. In this manner all the parts of the masking frame with the exception of rim 39 lie with their undersides flat against the top of base 31, when the masking frame is inserted thereon and snugly against the sheet of light sensitive photographic material, when it is placed on the top of base 31.

Each of the picture areas 37 to 37c is provided with one removable rectangular lid 41, each of which has in its center a spherical handle 42. Picture area 37, in the upper left corner of the masking frame 32, is shown with the lid removed. Lids 41 are slightly smaller than the opening defined by the sections of edge members 33 and 34 and of cross bars 35 and 36, but closely fitted, so as to be readily insertable and removable into the respective picture areas without excessive play. The underside of the outer edge portions of lids 41 are situated on masks 40, when the lids are inserted in the picture area.

Passage of light, falling from the enlarger onto the easel, through the joints between the inner edges of the members defining the picture areas and the adjoining edges of the lids, is safely prevented by the presence of masks 40. Masks 40 in combination with the cross bars 35 and 36 and outer edge members 33 and 34 provide the white or unexposed edges or margins around each of the individual prints or representations produced in each picture area. The width of each of masks 40 plus that portion of each of the outer edge members 33 and 34, which cover or shade the edges of the standard light sensitive photographic sheet material, when it is inserted in the easel, must be at least as wide, and the width of each of the cross bars 35 and 36 plus the width of the two adjoining masks 40 must be at least twice as wide as the desired width of the white or unexposed edge in each of the finished individual prints. Preferably the covered or shaded edges and strips are made slightly wider than required, so as to permit trimming of the edges of the finished prints for the production of a clean straight edge or of a serrated edge, as may be desired.

It may be of advantage to provide each picture area with an additional or auxiliary mask, which slightly projects into the free area, defined by the members of the masking frame and which actually produces upon exposure the edges, separating the pictorial representation from the margin of each print on the sheet of photographic material. The auxiliary masks may be made from a variety of thin light impervious materials.

Each of the auxiliary masks may be cut and attached individually to the underside of the members, defining each picture area of the masking frame 32. More advantageously the masks are combined to form a grid or pattern of a size, equal to or slightly larger than the standard photographic sheet material to be used in the easel, so that it extends at least in part under the outer frame 38 of the masking frame 32. The grid comprises a number of openings of a shape, relative position and dimensions, corresponding exactly to those of the desired prints (or representations), to be produced with the masking frame to which the grid is attached.

For the obtention of sharp edges in the prints, the auxiliary masks are advantageously made from very thin light-impervious sheet material, e.g. by stamping or cutting. Metals are most suited e.g. thin flexible steel, brass, copper, or alloys of these or other metals. Certain plastics or thin papers may also be used. Examples are celluloid, cellulose acetate and similar materials, which have been made light-impervious by the incorporation of pigments or dyes. Paper and cardboard materials, which are coated with thermoplastic polymeric materials are particularly useful for the purpose.

The individual masks or the composite grid or pattern of masks may be removably or fixedly joined to the underside of masking frame 32 in such manner, that the structural members of the masking frame are superimposed on the grid or pattern of the auxiliary masks, and none of the openings in the auxiliary masks is obstructed by the members of the masking frame 32 in any way. The composite auxiliary mask may be provided with threaded pins, which in an upward direction, are inserted into bores, contained in the edge members and/or cross bar members of the frame and secured thereto by nuts. Any other equivalent means for removably fastening of the grid or pattern of auxiliary masking means to the masking frame may be used with equal advantage. The expedient of fastening the grid or pattern of auxiliary masks removably to the masking frame, offers the advantage of exchangeability, permitting the substitution of new masks in case of wear or damage to the edges of the masks, or, if it is desired, the exchangeable use of masks, which produce unexposed margins of differing widths on the finished individual prints in a given masking frame. If exchangeability is not desired, the masks may be permanently attached by soldering, welding, use of adhesives or other fastening means well known in the art.

The masking frame 32, including masks 40 may be produced, in one operation e.g. by stamping from one piece, when metals, cardboard or plastics are used as the construction materials, or by extrusion, when thermoplastic materials or suitable metals are employed for the production of the masking frame. Those made from thermoplastic polymeric materials may also be produced with advantage by vacuum or pressure forming techniques. If the above described auxiliary masks are used, masks 40 may also be omitted altogether, without detracting from the utility of the easel.

Rim 39 extends, as stated, over at least part of the sides of the base, when the masking frame is placed on the base. This expedient prevents the passage of stray light to the edges of the light sensitive photographic material contained on the base. If properly dimensioned, it prevents also the paper from changing its position or partly sliding from the base. Thus, the rim 39 serves in this embodiment of the easel as the centering means for the standard sheet and at the same time as the registering means for the masking frame. This function of the rim 39 is most effectively accomplished, if the dimensions of the base and of the standard sheet of light sensitive photographic material and the interior dimensions of the rectangular rim 39 are all approximately the same, with the size of the rim 39 being just enough larger to permit its insertion over base and standard sheet. A third function of the rim 39 is the stabilization of the masking frame against warping or deformation. The strengthening of the masking frame by this expedient permits lighter and less bulky construction of the masking frame. It permits also the use of less rigid materials such as natural or synthetic plastic materials or heavy cardboard, preferably coated with thermoplastic materials for their construction.

The base may be made from metals, plastics or wood. Plywood was found to be particularly suitable. For more demanding work, the base 31 should be weighted, e.g., with metals such as steel or lead. For this purpose it may be inserted in a heavy frame of steel or other metal, or it may be laminated or attached to a plate of steel or other heavy metal of sufficient weight, to prevent accidental shifting of the easel during the manipulation of the enlarger. The total height of the base is advantageously slightly less than one inch, so as to provide the standard height of one inch for the surface of the light sensitive photographic material, when the easel is to be used with enlargers, having provision for automatic focussing.

The masking frame is advantageously provided with a pair of suitable handles, one each on the opposing narrow sides, so as to facilitate its handling and its insertion onto and its removal from the base. The masking frame may also be hinged to the base with or without the use of latching means, permitting it to remain in the open position or be readily closed, as may be desired by the operator. Suitable adjustments in the width of the hinged edge members of the mask and in the positioning of the corresponding portion of the rim permit free movement of this part of the masking frame in relation to the base. Alternatively, a groove may be provided in the vertical edge of the base, to which the masking frame is hinged. The groove is dimensioned and shaped, so as to receive the retracting portion of the rim and of the hinged edge member, when the masking frame is raised. Advantageously, the hinges are of the releasable type, which permit readily the removal or insertion and exchange of the masking frames on the base.

The individual picture areas have been shown, in the just described embodiment of the easel, as being rectangular. They may also be square, circular, oval or have any other desired shape. Their number may vary from 2 to 12 or more up to 24 or higher, depending on the size of the standard sheet, for which the easel is designed, and depending on the desired size of the individual picture areas, or of the prints to be produced in the easel, respectively. If the standard sheet has a size of 8 x 10 inches, a two-exposure frame will produce two 5 x 8 inch size pictures including the margins, which, depending on the desired width of the margins, have correspondingly smaller useable picture areas of approximately 4.5 x 7.5 inches, or slightly less. In the case of a four-exposure frame, each picture area will be approximately 4 x 5 inches in size with the margins included, and with ¼ inch wide margins the effective picture areas will be approximately 3.5 x 4.5 inches. The frame may be subdivided in similar manner into 6, 8, 10 or more rectangular picture areas of correspondingly smaller sizes. If desired, the masking frame may also be subdivided into a multiplicity of substantially square picture areas. With the standard 8 x 10 base sheet, six picture areas may be outlined, each having a size of 3⅓ x 4 inches, or, if desired, of exactly 3⅓ x 3⅓ inches or twelve individual areas of approximately 2⅔ x 2½ inches, or, if desired, of exactly 2½ x 2½ inches, including the margins.

To provide flexibility in the choice of picture sizes, which may be produced in the easel of the present invention, a given base is advantageously provided with a multiplicity of masking frames of identical overall dimensions, but having different subdivisions, including a frame providing just one single exposure of the full standard sheet for which it is made. Thus, one and the same easel may be used to produce, as described, pictures of the 8 x 10, 5 x 8, 4 x 5, 3⅓ x 4, 3⅓ x 3⅓, 2⅔ x 3⅓, 2⅔ x 2½ and 2½ x 2½ inches sizes with 1, 2, 4, 6, 9 or 12 exposures, respectively, on one standard sheet of the 8 x 10 inches size. A similar number of individual prints, each being slightly larger, may be produced on a standard sheet, having the commercially available precut size of 8.5 x 11 inches. With larger or differently dimensioned standard sheets correspondingly more exposures can be made on one sheet. Any other desired size of the picture areas may be provided and the easel may also be designed and dimensioned, to handle a square base sheet.

The various masking frames are all made to fit the same base, so that all possible picture sizes can be produced on one base or in one and the same easel respectively, merely by exchanging the masking frame. This is important, because it permits quality construction of the base to high standards, without requiring the photographer to purchase more than one base for all his needs, once he has decided on the size of the standard base sheet of photographic material, which he wishes to use. This new system gives the added advantage, that the photographer needs to store only one size of the light sensitive photographic materials. This reduces the capital tied up in stocks of the different photographic materials and reduces the losses of material due to outdating or overaging. The possibility of producing with the help of the easel of the present invention prints or images of any desired size without the need for tedious precutting of the light sensitive materials in the darkroom, eliminates also the losses resulting from errors in the dimensioning of the pieces, caused by oversizing or undersizing the individual cut pieces.

The expedient of using only one standard size of photographic material is of particular importance with color printing films and color printing papers, which can be safely stored in a broken package for only limited periods of time. The new system of making a multiplicity of exposures on one sheet, gives also the important advantage, that a multiplicity of prints is processed as a unit. This is time-saving and of particular importance with color materials, such as the negative and positive transparent or paper backed, color printing materials, which require tedious time consuming treatment in a large number of processing steps.

Lids 23 will normally be removably inserted into the masking frame as shown in FIG. 1. They may however with advantage be hinged with one of their sides to the masking frame by the use of suitable hinges. Instead of providing spherical handles 42, any other suitable gripping means or handles may be substituted.

Figure 3:
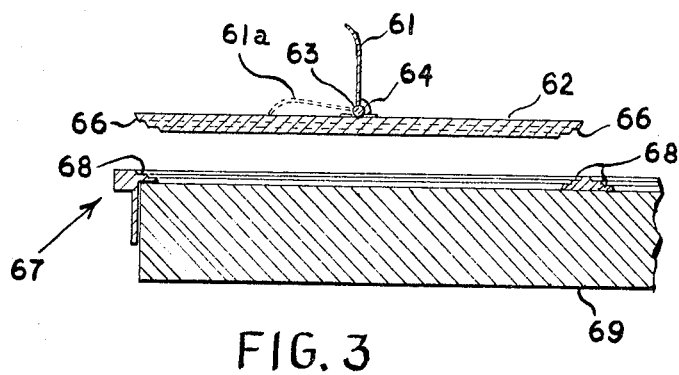
FIG. 3 is a vertical sectional, fragmentary view of a base and masking frame with a preferred embodiment of a lid shown in exploded position.
Figure 4:
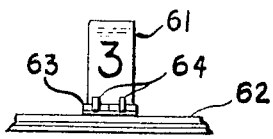
FIG. 4 is a fragmentary elevational view of a lid, having a pivotable handle.

A particularly beneficial embodiment of a handle is illustrated in FIGS. 3 and 4 of the accompanying drawings. Handle 61 is made up of a strip of thin sheet material, slightly curving backward in its upper portion and pivotally fastened to lid 62 over hinge 63. Hinge 63 is mounted approximately in the center of gravity of lid 62. The handles provided on the lids, making up a series in one masking frame, are consecutively numbered, in the manner shown in FIG. 4, where the pivoting handle carries the numeral 3. Handle 61 is shown in upright or vertical position, where it is arrested by stop 64, which prevents it from pivoting to the right toward the lid. Provision of a spring or catch or other means (not shown) holds the handle pivotally in the upright position. Handle 61 may be pivoted backward to a nearly horizontal rest position 61a, close to the lid as shown in broken lines.

Employing a masking frame, containing the just described embodiment of lids and pivotable and numbered handles in the production of a multiplicity of prints, the operator raises all handles to the upright or vertical position, before he starts the exposure of a fresh standard sheet of photographic material in the easel. Use of this starting position has the advantage, that each of the handles interferes very little, if any, with the focussing and composure of the individual pictorial representation on the lids, representing the respective picture areas. It permits also ready removal or opening and reinsertion of the lid. Having composed, with the lid inserted, the projected representation in the picture area numbered "1," the operator makes, after removal of the lid, the desired exposure on the portion of the base sheet, underlying picture area No. 1. Upon reinsertion of the lid, the operator depresses the handle to the lowered, nearly horizontal position. This serves as an indication, that the area, underlying this lid, has been exposed. Thereafter, he repositions the easel for composure of the next representation in the picture area numbered "2," removes the lid and makes the exposure in the section of the base sheet, underlying this picture area. After reinsertion of the lid, he depresses the handle, repeating the procedure in each picture area, until all available exposures have been made on the base sheet, contained in the easel, whereupon the sheet is removed from the easel for further treatment and finishing. As can be readily seen, the use of the pivotable, numbered handles and the following of the just described procedure safely avoids skipping of one or more picture areas or the making of unintentional double exposures on any one of the picture areas.

The use of the numbered, pivotable handles is of particular advantage, where a very large number of exposures is to be made on one sheet, as is the case in making, for instance (35 mm. positive color transparencies from color negative films on an 8 x 10 inches sheet of print film. The standard 8 x 10 sheet accommodates approximately 35 exposures of the standard 35 mm. size with unexposed margins or borders, large enough to permit their mounting in the standard cardboard or plastic ready mounts for projection. The masking frame accommodating the 35 mm. size of prints, has thus 35 individual picture areas.

As is readily apparent from the foregoing description, the use of the multiexposure easel of the present invention makes it possible to produce color transparencies in the enlarger directly from color negatives. The system provides great advantages over the now widely practiced system of making color transparencies directly on 35 mm. reversal color films. Inaccuracies in the exposure and color rendition may be adjusted and corrected in the course of exposing the positive color transparencies in the enlarger. The operator has free choice of the degree of enlargement or reduction respectively, and thus of the exact relative size of the representation and of the cropping, he desires to use. Any number of high quality transparencies may be produced from a given negative, obviating the need for the direct duplication of the transparencies with the unavoidable loss in the quality of color rendition or the making of an expensive intermediary negative from the original transparency. Any other desired size of positive color transparency may be produced from a given color negative in the multiexposure easel of the present invention by providing the approximate number of picture areas of the desired size in the masking frame. Accuracy of focus in the actual exposures is assured by the employment of the height adjustable embodiment of the base described hereinafter, or by the use of enlargers having provision for automatic focussing.

The operator may also produce from the same negatives any number of colored positive prints or enlargements on paper backed materials, and, if he desires, he may produce black and white prints directly on suitable panchromatic papers, or, if he prefers, he may produce in the multiexposure easel of the present invention, black and white intermediary negatives for use in the production of high quality black and white prints and enlargements. Thus, the use of the multiexposure easel of the present invention permits the photographer to make all his exposures on color negative materials and select the mode of positive representation later. This obviates the inconvenience of carrying several cameras, each loaded with a different type of film material, and reduces at least in part the need for carrying for each camera an assortment of the various focal length lenses.

Lid 62 in FIG. 3 is provided all around with stepped down serrated edge 66. The masking frame 67 used with this embodiment of the lid, shown inserted on base 69, has a like but reversed stepped up serrated edge 68 around the inside of each picture area, with the wider opening at the top of the picture area. This embodiment of the lid and masking frame has the added advantage of ready insertability of the lid, which readily slides and drops into the proper position. It permits also greater tolerances in the fitting of the lids into the frames. The stepped down design safely prevents passage of undesired stray light, even if the joints between the frame and lids are not kept to their smallest.

The masking frame, masks and the underside and sides of the lids are advantageously made non-reflective and preferably black or of dark color. This expedient assists further in safely avoiding unintentional passage of stray light to the light sensitive photographic sheet, contained under the masking frame. The top sides of the lids are advantageously made reflective, preferably white, so as to permit composure and if desired, focussing of the projected image on the lids. Exact composition of the image or other representation is made possible by dimensioning the reflective or white surface area such, that it corresponds exactly to the opening, defined by the underlying mask, when the lid is inserted in rest position in the masking frame. Since each lid is superimposed and overlying the edge of masks 40 or the auxiliary masks, respectively, the provision of a non-reflective or black of dark colored margin around the edges of the top of each lid of appropriate width, leaves the central deflective area corresponding in size and shape to the underlying useable picture area.

The lids are advantageously made from sheet material, having sufficient structural strength, to hold their plane shape, but being at the same time as thin as is feasible with the particular selected construction material, without loss of structural strength. Suitable materials are metals of various kinds, such as for example steel, brass, aluminum or magnesium. Minimum thickness of the lid and its positioning as close as possible to the surface of the photographic material, contained in the easel, makes it possible to focus the image directly on the white upper surface of the lid and make the final exposure on the light sensitive material after removal of the lid without a need for refocussing or readjustment of the easel. With all but the largest lens openings of the enlarger lens, and with most ratios of enlargement, with the exception of very small ratios of enlargements and of reductions at wide open lens apertures, the range of focal depth of most lenses commonly used in enlargers, is usually substantially greater than the thickness of the very thin metal lids.

The use of lids of greater thickness is recommended primarily only for easels, which are to be used with enlargers, having provision for automatic focussing, because they do not require individual focussing for each exposure. They may also be used with the embodiments of the easel, having provision for vertical height-adjustment, providing different heights of the easel or of the top of the base, respectively, for focussing and exposure, as will be described hereinafter.

Figure 5:
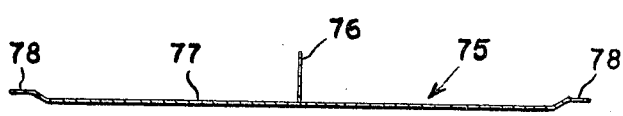
FIG. 5 is a vertical sectional view of another embodiment of a lid, useful in the easel of the invention.

A particularly advantageous embodiment of the thin lid is depicted in FIG. 5 of the accompanying drawings. Lid 75, having handle 76, comprises flat central portion 77, which corresponds in its shape to the open area or useable picture area, respectively, defined by the mask or auxiliary mask, contained in the picture area, but which is slightly smaller than said open area. To the flat central portion 77 of the lid is joined a slightly raised edge portion 78, all around the outer edge of the lid. The height differential between central portion 77 of the lid 75 and the outer raised edge 78, corresponds to the thickness of the mask and/or auxiliary mask, contained in the picture area. The shape and dimensions of the lid, as defined by the outer free edge of raised portion 78 correspond approximately to those of the picture area in the masking frame, as described hereinbefore, being just sufficiently smaller to permit ready insertion and removal of the lid into and from the masking frame. When the lid 75 is inserted in the masking frame, its central portion 77 is in close contact with the light sensitive surface of the photographic sheet material, contained in the easel. The raised edge 78 is positioned on the mask and/or auxiliary mask, respectively, so that passage of stray light, through the joint, to the light sensitive photographic material is safely prevented. The vertical edges and the underside of the lid as well as the upper side of the raised edge portion 78 are non-reflective or dark colored, defining on the top of the lid a central reflective or white area for focussing and exact composition, by giving said reflective or white area exactly the shape and size of the underlying useable picture area, defined by the inner edges of the mask or auxiliary mask.

The lid 75 may be conveniently produced in conventional drawing or stamping operations. The provision of the raised edge has the added advantage, that the lid gains structural strength, permitting the use of still thinner sheet metal for the manufacture of the lid without undue risk of warping or other distortion in use. In this manner lids of 200 microns thickness or more, depending on the nature of the construction material, have proven to be quite useful and durable. Construction from still thinner materials is possible, if one or more reinforcing elongated indentures or corrugations are provided across the main body 55 of the lid, preferably in the direction of the diagonals and raised toward the top of the lid, so as not to interfere with the close, flat positioning of the central portion of the lid on the surface of the underlying light sensitive photographic material. Keeping the number of such reinforcing corrugations or indentures to a minimum, avoids undue detriment to the convenience and accuracy of the focussing process. Lids from sheet metal of ¼ to 1 mm. or greater thickness have usually sufficient structural strength to withstand the effects of long useage without the need for special reinforcement.

If a greater degree of focussing accuracy is desired, or if the lids are to be produced from thicker sheet materials, as is desirable in the case of their construction from cardboard, wood, plastics or glass or similar materials, it is preferable, to employ another embodiment of the multiexposure easel of the present invention, having a base, which has provision and means for controlled height adjustment. In this embodiment of the easel, the adjustable base contains means, which permit the raising and lowering of the base by a height differential, which corresponds exactly to the height differential between the top of the lid, in its inserted position, and the top of the light sensitive photographic material, contained on the base.

The vertical adjustability of the base may simply be achieved by the provision on its underside of retractable supporting members, which by suitable means may be secured in a projected position, so as to raise the base by a predetermined height differential, when it rests on the supporting means. When the base is to be lowered, the supporting members are simply released, so as to retract all the way into the base, if the bottom of the base defines the lowered position, or the supporting members are secured in a somewhat retracted position, if they are to hold the base in the lowered position. As is readily apparent, the difference between the projected and retracted positions of the supporting means must correspond exactly to the difference in the vertical elevation between the top of the lid, when it is inserted in the masking frame and the top of the light sensitive photographc material, contained under the lid on the base, if the sharp representation achieved on the lid by the preliminary focussing is to be maintained on the photographic material, when the base is raised by the predetermined height differential for the exposure. For the focussing of the next representation on the next lid, the base is again lowered and thereafter raised for the actual exposure and so forth.

Suitable supporting means, which may be used in the adjustable base, comprise threaded spindles, contained in a suitable threaded sleeve with a handle and stops in either direction, permitting the turning of the spindle by an angle, which produces just the desired height differential. The bottom end of the spindle may be pointed, so as to hold the easel securely on the support on which it is contained, preventing inadvertent lateral movement under the enlarger, or it may be provided with rubber feet, which serve the same purpose.

Other supporting means comprise retractable pins, which are held in the projected or retracted position by a suitable eccentric assemblage, containing e.g. eccentric discs or rolls, known per se, which by the turning of a handle or knob, actuate the pins, so as to bring them in either the projected or retracted position. The handles or levers, used to actuate the supporting means, may be combined with suitable mechanical means to permit the actuation of all supporting means, usually three or four, from one central position.

An embodiment of the adjustable base, employing three retractable pins, controlled by wedges, is shown in FIGS. 6 and 7. Base 85 contains the assemblage for height adjustment recessed in a system of channels, provided in its bottom side with longer channel 86 and perpendicularly thereto shorter channel 87 with short channel sections 87a, joined at right angles at the ends of the latter. Lever 91 is coaxially contained in channel 86, slideably held by clamps 89, with handle 92, joined to its free end, protruding from the base. To lever 91 is fixedly and perpendicularly joined to cross bar 92, which is suspended in short channel 87.

To the free end of lever 91, situated toward the rounded off end of channel 86 is joined one of wedges 95, recessed in the far end of channel 86. One additional wedge 95, of like size and shape, is joined at right angles to each of the free ends of cross bar 92. The latter two wedges 95 are recessed in the rounded terminal channel section 87a. All three wedges 95 are slideably mounted in a common plane and oriented parallel to each other. Each of wedges 95 has slot 101 parallel to its long sides, through which slots project pins 103 with lower stops 104 and upper stops 105. The pins are set in disc 106, which in turn is contained recessed in bore 110. Disc 106 is threaded and screwed into cooperating threads 111, contained in the walls of bore 110 to a depth such that the distance between the low edge of stop 105, when it touches the top end 112 of bore 110, and the upper edge of disc 106 corresponds exactly to the height differential between the top surface of the lids, when they are inserted in the masking frame and the top surface of the sheet of light sensitive photographic material on the top of the base. Stops 104 cooperate with the low edge of wedges 95, forcing the pin downward and resulting in the raising of the base, when the wedge is pushed toward the right (in FIG. 7) so as to bring between the bottom of the channel and stop 104 a thicker portion of the wedge. The travel of wedge 95 will be stopped, when the pin is lowered in bore 110, until the underside of stop 105 rests on the top of disc 106, securely held by wedge 95 in this position. When the wedge is retracted to the left, bringing its thinnest portion between the bottom of the channel and stop 104, the pin retracts into bore 110 by the weight of base 85, until top end 112 of bore 110 rests on stop 105.

The length of the slot 101 in each of the wedges is chosen such, that they are longer than corresponds to the length of travel of the wedges, required for bringing about the height differential of the pins between the upper and the lower rest positions. Stops 105 serve also to hold pins 103 in the sleeve, preventing their falling out, when the base is lifted up.

The height adjustment of the base 85 is achieved, when it is placed on a table or the base board of the enlarger by the operation of the handle 91. Pulling the handle 92 away from the base, will force the thicker portions of the wedges 95 between stops 104 and the bottom of the channels 86 and 87, forcing the pins out and thus elevating the base to its high position. Pushing the handle in, will bring the thinner portion of the wedge between the stops 104 and the bottom of the base, permitting retraction of the pin by the weight of the base 85, until the base rests in its low position. As is readily seen, this expedient assures at all times and reproducibly a constant height differential of the base and thus accurate focussing with the masking frame and coordinated lids, for which the height adjustable base is designed.

Another advantageous embodiment of the adjustable base for use in the multiexposure easel in accordance with the present invention is depicted in FIGS. 8 and 9 of the accompanying drawings. Base 120 is vertically movably suspended in rectangular box member 121, comprising bottom 122 and joined thereto vertical frame member 123. The suspension of the base 120 in box member 121 is achieved by four pins 124, which are mounted in the corresponding vertical edges of base 120 and which project through cooperating vertical slots 125, contained in the shorter sides of frame member 123. The length of the slots is dimensioned such, that the vertical movement of the pins, and thus of the base, permitted by the slots, corresponds exactly to the height differential between the plane, defined by the top surface of the inserted lids and the plane, defined by the top surface of the underlying light sensitive photographic material.

On each of pins 124 is mounted a washer 128 such, that it is located between the vertical side of the base 120 and the inside of frame member 123, their thickness being such, that base 120 has a minimum of play in the frame member 123 without interfering, however, with its free vertical movement.

A wedge-shaped indenture 129 in the central bottom section of base 120 cooperates with wedge 130, which is slideably contained in rectangular depression 132 in bottom 122 of box member 121. Wedge 130 is joined to lever 135, extending movably through reinforced and extended bore 138 in one of the long sides of frame 123. Lever 135 projects to the outside of frame member 123 and carries at its free end handle 136. The angles of the slopes of wedge 130 and of wedge-shaped indenture 129 are identical.

The height adjustment i.e. the lowering or raising of base 120 is achieved by the operation of lever 135. Pushing in handle 136 toward the base 120, permits it to drop by its own weight, until all four pins rest on the lower edge of each of the coordinated slots 125. This brings the base into the low position for focussing onto the inserted lid. Pulling the handle away, raises the base to the height at which the pins 124 are stopped at the upper end of the slots 125. The wedge 130 holds the base in the raised position, in which the light sensitive layer of the photographic material, contained on the base, is in exactly the same plane, as was the top surface of the lid, when it was inserted for focussing. Thus, after removal of the lid, exposure of the focussed representation on the sheet of light sensitive photographic material produces a sharp latent image.

The wedge 130 may be made from any desired material. Nylon has proven to be particularly suitable. To prevent lateral movement of the base, the play of the washers is kept to the minimum possible, without restricting the freedom of the base 120 to move up or down. The washers 128 are therefore made advantageously from a slippery material, such as nylon.

Undesired lateral movement of the base 120 may also be prevented by providing at least one additional pin and cooperating slot on each of the long sides of the base and frame members, cooperating and dimensioned as described hereinbefore. In this modification of the adjustable base, the washers 128 may provide more play or they may be dispensed of altogether.

Box member 121 and/or frame member 123 are advantageously made from a heavy material, such as steel or other heavy metals, so that its weight is great enough to give stability to the easel, preventing its accidental displacement during its use, yet permitting its intentional free lateral adjustment for cropping and composition of the pictorial representations to be exposed in it.

Instead of using a single wedge 130, as the means for raising and lowering the base in the frame, one may also employ a multiplicity of wedges, e.g. four wedges, one each in each corner, whereby each wedge is provided with its own cooperating wedge-shaped indenture. In this modification of the adjustable base, the wedges are connected to each other and to a common lever and handle by mechanical means, known per se. Eccentric discs or rolls with suitable levers and mechanical connecting means may be readily substituted for the wedge assemblage. With the latter modification of the adjustable base, a rotatable knob may be provided at one side of the base, instead of the retractable lever. The knob is turned by the operator, to provide the desired height adjustment. Instead of using the frame member 123 with the slots 125 and pins 124 as the means for fixing the height differential in the adjustable base, one may also employ a flat base plate with the wedge arrangement, described hereinbefore, but using vertical pins, anchored fixedly in the top of said base plate. The pins carry at their free end stops, which project into bores, contained in the bottom side of the superimposed base, including a threaded sleeve, in an arrangement similar to that, shown in FIG. 7, but omitting the wedge 95 and lower stop 104. The operation of this embodiment of the adjustable base is similar to that described hereinbefore.

The lever or the knob, employed to actuate the height adjustment means is advantageously coupled to means, which lock the lids inserted in the masking frame, as long as the adjustable base is in its low position i.e., in the focussing position. By raising the base to its high position, i.e., to the exposure position, the locking means retract, permitting the removal or opening of the lids, as may be desired. This expedient avoids, that the operator accidentally exposes, when the base is in the low position.

Many other means are available to provide height adjustment of the base. The embodiments, illustrated and described hereinbefore, are merely exemplary of the arrangements and means, which may be used with advantage to provide height adjustability of the base in accordance with the teachings of this invention for accurate prefocussing on the lid and readjustment of the base for exposure of the light sensitive photographic material, contained on the base. The various means, described hereinbefore may be readily substituted or recombined, to produce equally suitable additional embodiments of the height adjustable base.

Hereinbefore, the base has been described as having approximately the same size, as has the photographic sheet material to be processed in the easel. In actual use of the easel, the standard sheet of light sensitive photographic material may be slipped into the masking frame with its light sensitive side pointing toward the masking frame. The masking frame, with the sheet contained on its underside, is then placed over the base. In this manner, the sheet positions and registers itself on the base and is held plane on the base by the masking frame. Photographic sheet materials, which are relatively straight and do not have the tendency of severely rolling or warping, may also be simply placed on the base, and the masking frame is placed over the sheet and base. This mode of operation is conveniently practiced also with sheet film, glass plates and heavy paper stock.

Still greater convenience and more versatility can be achieved, if means are provided in the easel of the present invention, which guide and hold the sheet material in the proper fixed position relative to the masking frame, so as to assure accurate margin widths and full utilization of the useable area of the photographic sheet material at all times, even with careless handling. If suitable centering means are provided in or on the base, the base may be made larger, than the actual size of the standard photographic sheet material to be processed in the easel. Still greater accuracy is achieved in this embodiment of the multiexposure easel, if registering means are provided which in addition assure exact location and holding of the masking frame on the base in relation to the sheet material. The provision of suitable registering means for the masking frame permits more convenient and speedy insertion and removal of the masking frame, without loss of exact superposition of the frame over the sheet material.

A combined centering and registering arrangement which achieves both objectives vis. registering the masking frame and centering of the photographic sheet material relative to the base is depicted in FIGS. 10 and 11 of the accompanying drawings. Base 151 is provided on each side with two pins 152, which extend vertically upward from the top of the base. Pins 152 are spaced so as to outline a rectangular area between them, which corresponds exactly to the size of the light sensitive photographic sheet material 153, located on the top of base 151. The pins are dimensioned and located, so as to cooperate with bores 154, provided in the outer wide edge members 155 of masking frame 156. Each bore 154 has the shape of a reversed funnel, with the base of the conical opening located at the underside of edge members 155 of the masking frame 156. The upper, narrow cylindrical portion is superimposed on the cone, extending upward into circular cups 159, provided on top of edge members 155. The reversed funnel-like configuration of the bores 154 facilitates the insertion of the masking frame onto the base by guiding the pins 152 into the correlated bores 154. The cups 159 close off bores 154 at the top, so as to prevent light from penetrating through the bores and by the pins to reach the edges of the photographic material. The masking frame shown in FIGS. 10 and 11 has eight individual picture areas 161 with eight cooperating lids (not shown). The base may be provided with means for automatic height adjustment, as described hereinbefore. A grid or pattern of masks, providing the desired margins on each print, may be attached to the underside of the frame, as described hereinbefore.

In the actual use of this embodiment of the masking frame, the photographic sheet to be exposed is dropped into the rectangular area, defined by the pins, and thereafter the masking frame 156 is placed upon the base in register with the pins, so that the pins penetrate into bores 154 and cups 159, and masking frame 156 rests on the base. The weight of the masking frame will flatten and accurately center the photographic sheet, holding it flat on the base, even if it is light paper stock. The pins hold or center the sheet in the exact predetermined position with respect to the masking frame and the base. This embodiment of the multiexposure easel permits accurate positioning of the sheet material in extremely rapid, convenient operation and is also employed with advantage in the single exposure easel, having one single picture area, described hereinafter.

The number and positions of the pins in the just described embodiment of the easel may be varied. Three or four or more pins may be provided along each side of the base. However, it was found, that a minimum of two pins contained on each side of the base, assures accurate centering of the photographic sheet and register of the masking frame, if they are not placed at the corners of the rectangular or square base. Less than two pins on each side of the base are feasible, but are not recommended because of possible misalignment of the sheet material, if the operator is not using care, when inserting the sheet of photographic material.

Instead of employing the just described registering pins as the means for centering the sheet of light sensitive material, one may also employ in the multiexposure easel of the present invention any of the many other means known for this purpose, such as fixed or retractable U-channels or angle bars with their open sides facing toward the center of the easel, so as to receive and hold the sheet of light sensitive material in the predetermined orientation and position. The U-channels or angle bars may be provided all around, or on three of the sides or only on two of the sides. They may be short sections, or they may extend over the full length and width of the sheet of light sensitive material. They may also be provided in form of rectangular sections of U-channels or angle bars, mounted in the corners of the area, where the sheet is to be positioned. If the U-channels are fixed, the masking frame has provided on its underside indentations, adapted to cooperate with and receive said U-channels or angle bars. It is also preferred, with the fixed variety of U-channels, that they are provided at at least three of the sides of the areas, receiving the sheet.

The retractable variety of the U-channels or angle bars is depressed into cooperating channels, provided in the base, by the weight of the masking frame, when it is inserted thereon. The sheet of light sensitive material is thus held securely in place by the contact of the upper horizontal edge of the U-channels or angle bars with the edge of the sheet of photographic material. This variety of the U-channel or angle bar need not be provided all around the rectangular area, receiving the sheet of light sensitive material. Often it will be sufficient, if only one channel is provided, e.g. along one of the longer sides of the light sensitive material with a stop at one or both ends, so as to determine and localize also the transverse position of the sheet. However, it was found, that the U-channel requires some skill and care with the insertion of the sheet, so as to avoid misalignment of the sheets, particularly if the heavier paper stocks are used.

Instead of using the just described U-channels or the angle bars, one may also employ low vertical stops of e.g. one eighth to several eighths of an inch height which outline the area, which is to receive the photographic sheet material. The stops may form a rectangular continuous vertical band all around said area, or they may be provided only in the center sections of each side and/or in the corners of said rectangular area. The stops are advantageously fixedly joined to the base, and correspondingly, cooperating indentations are provided in the masking frame, so as to receive the stops and register the masking frame, when the masking frame is inserted on the base. Alternatively, a rectangular depression may be provided in the top of the base of dimensions, corresponding to those of the standard sheet. The sheet is inserted therein, and the masking frame, with its central rectangular portion protruding into the depression in the base, holds the sheet flat in the depression, when the masking frame is inserted.

Other centering means, which may be used with advantage in the base, are springloaded, retractable pins, which project from the base, when the masking frame is removed from the base and permit the correct insertion of the sheet of light sensitive material in the predetermined orientation and position. Upon insertion of the masking frame the pins are depressed by the weight of the masking frame into cavities, provided in the base, leaving the sheet of light sensitive material in the predetermined orientation and position, where it is then held by the weight of the masking frame.

In the embodiments of the base, wherein the retractable centering means are used, the masking frame is registered with the base by the rim as described hereinbefore. Alternatively, additional registering pins may be provided on the base, e.g. in the corners, cooperating with bores in the underside of the masking frame, as described, or, alternatively, register pins may be provided on the underside of the masking frame, cooperating with corresponding bores, provided in the base at a location in the margin of the base, which is not occupied by the inserted sheet of light sensitive photographic material.

Any other suitable centering means may be employed in the multiexposure easel of the present invention, however, as will be readily seen, the fixed pin centering and combined registering arrangement, described hereinbefore, and forming part of the invention, is preferred, because of its simplicity, inexpensive construction, convenience in operation and reliability. It was found to be particularly useful, where the light sensitive sheet material and the masking frame are to be inserted in complete darkness. As an additional convenience and aid for such use in complete darkness, the tops of the pins are advantageously marked by the application of luminescent materials, such as luminescent paint or the like. This expedient provides a helpful guide in finding the rectangular area, into which the sheet of light sensitive material is to be dropped, and onto which the masking frame is to be inserted.

The present invention comprises also another important embodiment of the easel, which permits conveniently the production of prints or other representations by photographic reversal techniques, resulting in prints with white or clear margins, instead of the black margins, normally obtained by these methods. This embodiment of the invention comprises a base and masking frame, similar to that described hereinbefore, and if desired, any of the adjuvant and auxiliary means with the improvement, that the masking frame and all its parts are made of a material, which is pervious to light such as clear or transparent plastic materials or glass. The lids are light-impervious as described hereinbefore. If the lids are hinged to the masking frame, the hinges should also be made from transparent material, the same as locks, stops etc. which may be provided on the masking frame. No masks are needed in this embodiment of the easel. In fact, the embodiment of the masking frame as shown in FIGS. 10 and 11, if made of transparent or light transmitting material, is excellently suited for reversal printing. The masking frame may have, in this embodiment of the invention, any desired number of individual picture areas including one single picture area of a size, which is slightly smaller than the size of the standard sheet, so as to permit also the production of positive prints or representations on reversal materials, having the full size of the standard sheet and being surrounded by a white border or margin, when the print is finished.

The outer edges of each lid form in this embodiment of the invention the mask, defining the useable picture area available for printing, outlining the separation between the useable picture area and the border or margin. In order to produce a sharply defined separation between each of the picture areas and its surrounding border or margin, it is preferred to use lids made of thin material, having sharp straight edges in which the edges and preferably the whole body of the lids lie completely flat and tightly against the top surface of the underlying sheet of light sensitive photographic reversal material. Preferred are the lids, which are stamped or cut out from thin sheets of rigid metals.

An extended white light exposure of the margin areas through the transparent masking frame with the lids inserted, before or after the exposure of the individual picture areas, but before development of the sheet material begins, produces white or transparent margins, as the case may be. The full sheet including the picture areas is then exposed, to white light in the usual manner, after completion of the first and prior to the second development, to bring about the desired reversal of tone values and/or of color values. The lids are advantageously provided around the edges of the upper reflective surface with a narrow black or dark line, defining the approximate picture area, so as to facilitate the composition of the image on the lid.

Any of the various embodiments of the base described hereinbefore, may be used with the transparent masking frame. Cropping may be achieved by the use of lids, which are adjustable in their lengths and/or widths, or both or by the use of lids, which have at least one transparent edge with provision for adjustment of the horizontal width of said transparent edge or edges. Alternatively, one may use lids, having transparent edge portions and differently sized or adjustable light impervious areas, having a size up to the maximum dimension of the picture area, for which the masking frame is designed. In this manner the same effect can be achieved as described hereinafter, with the use of the adjustable masking and cropping strip. Advantageously, means made from light pervious materials are provided, which hold the lids tightly against the underlying sheet of reversal material, in order to produce the maximum in sharpness of the separating lines between the margins or borders and the pictorial representation.

Though a color tint in the transparent masking frame would be tolerable, if only black and white reversal materials are to be processed in the easel, or if always sufficient margin exposure is given with color materials, it is preferred to use, if possible, an absolutely colorless material for the construction of the transparent masking frame, if the easel is to be used for color printing. As is readily apparent, the transparent masking frame is used with particular benefit in the production of prints on paper backed materials by reversal techniques, where a white border instead of the usually obtained black border is often desired and not readily obtained by other means known in the art. If positive transparencies are to be produced by reversal techniques, it is usually preferred to produce black, non-transparent margins. This is readily achieved by the use of the embodiments of the masking frame, which are made from opaque, light impervious materials.

The use of the easel, containing the light-pervious masking frame, is further facilitated and its operation made more versatile, if it is provided and used with at least one adjustable lid, which has means for decreasing or increasing the size of the upper reflective area of the auxiliary lid, as may become necessary for the composing or cropping of the image.

Representative of the adjustable lid is an embodiment, which is made from a light impervious material as described hereinbefore, the top surface of which is, however, subdivided into one white or reflective half and in a black or non-reflective half. Advantageously, the subdivision is across the narrow dimension in the case of a rectangular lid. On the top surface of the lid is slideably provided a reflective cover, such that it may be displaced or moved in the direction perpendicularly to said separatory line, dividing the reflective and the non-reflective portions of the lid. The cover has advantageously a size, which corresponds approximately to the size of the reflective or of the non-reflective portion of the lid, respectively. Moving the cover all the way to the side of the lid, which contains the reflective area, all of the non-reflective area is exposed and the reflective area is completely hidden by the reflective cover. The lid will thus show in this position a reflective area, which is about half of the size of the full lid. Moving the cover fully in the opposite direction, enlarges the total reflective area and presents to the operator a composite reflective area, equal to the size of the lid. Setting it in any intermediary position, produces a reflective area, having a length in between the just mentioned extremes. The operator may thus crop his image to any size lying in between the full length of the lid and one half of the length of the lid.

By help of a marked or numbered scale, provided on the top of the lid, a symbol or number is coordinated to each of the positions of the cover, e.g. numbers from 0 to 10, zero being the full lid size and 10 being one-half the lid size or vice versa. A set of auxiliary lids, coordinated to and provided with a given adjustable lid carry the numbers 1 to 10. These auxiliary lids are of an overall size and thickness identical to those of the coordinated standard lid and the adjustable lid, so that either of them may be used exchangeably in a given picture area of the masking frame. Contrary to the others, the auxiliary lids are however composed of a light impervious section and a light pervious or transparent section. The relative size of the two sections in each auxiliary lid is different from the others and corresponds to the relative size of the reflective and the non-reflective areas in one of the positions 1 to 10 of the adjustable lid, so that a complete set of auxiliary lids comprises ten lids, one each for each of the positions 1 to 10 of the adjustable lid. The size of the transparent section corresponds exactly to the size of the non-reflective areas in the respective positions of the adjustable lid. The auxiliary lids are also numbered accordingly.

In the actual use of this embodiment of the easel for the making of positive reversal prints, having a white or transparent border all around, the operator places the standard sheet of light sensitive reversal material and the light pervious masking frame onto the base and inserts into all the picture areas of the masking frame the standard lids. If he decides during composition of the individual prints, that he wishes to crop any one of the images, he substitutes, with the enlarger shut off, the adjustable lid for the standard lid contained in this picture area and, after relighting the enlarger, he shifts the reflective cover, until the cropped reflective picture area suits the image he wishes to print in this area. He then reads the number indicated on the scale by the position of the cover, removes the adjustable lid, after shutting off the enlarger and exposes the image in the full exposed picture area. Thereafter, he inserts into the picture area the auxiliary lid of the number, corresponding to the reading of the scale of the adjustable lid with the transparent or light pervious section over that portion of the image, which is to be cropped out. The auxiliary lid is secured in this position and left in the masking frame. When all picture areas have been exposed with or without cropping, the operator simply gives the easel with the standard and/or the auxiliary lids inserted a white light exposure, sufficient to produce upon reversal white margins. After development and after treatment, each print is cropped as desired by the operator and each cropped print is completely surrounded by a white border or margin.

The same procedure using also the light pervious masking frame, the adjustable lid and the auxiliary lids, may also be employed in the production of positive cropped transparencies, having transparent margins all around, from negatives by simply substituting positive printing sheet film material, such as positive print film. The separate margin exposure provided at the end, with all lids and/or auxiliary lids inserted, must be long enough to provide the required density in the margins and in the cropped areas.

If the operator wishes to do much cropping, he may wish to stock several of the much used auxiliary lid numbers, particularly if the masking frame contains a relatively large number of picture areas, such as is the case in a masking frame adapted to produce cropped and uncropped small size prints e.g. of the 2¼ by 2¼, or 2¼ by 3¼ inches size, or of the 35 mm. size.

In order to assure always correct positioning of the auxiliary lids, both the auxiliary lids and the adjustable lid are advantageously provided with suitable projections or other suitable means on one side, which cooperate with suitable grooves or notches, provided in each picture area in the masking frame. These or any other suitable registering means make it impossible, to lose desired image area by misorientation of the auxiliary lid. The number of steps, provided on the scale of the adjustable lid and accordingly the number of auxiliary lids, making up one complete set may be varied to be more or less than 10. The optimum number depends on one hand on the accuracy of cropping, desired by the operator and on the other hand at least in part on the size of the picture area. With larger picture area sizes, one will usually prefer to have closer steps in the size of the useable picture area, provided by successive numbers of the auxiliary lids. Often it will not be necessary or desired to provide the possibility of cropping up to half of the size of the picture area. For most purposes it will be satisfactory, if the reflective area on the adjustable lid covers an exact square and the non-reflective area and the reflective cover correspond in their size to the difference between the full useable picture area and the said square area. In this manner, the losses of material are kept to a minimum, yet providing every possible ratio of the lengths of the sides within the limits of the rectangular picture area, provided in the masking frame used. In this modification of the adjustable lid, the steps from one auxiliary or partial lid to the next may be kept smaller with a given number of auxiliary or partial lids, or, the number of auxiliary or partial lids may be reduced without changing the step size.

The reflective cover may be slideably held on the auxiliary lid by means well known in the art, such as tongue and groove assemblages provided in the edges, or in the center of the lid. In another modification of the adjustable lid, the reflective cover is provided with narrow rims, extending over the edges of the lid parallel to the direction of its motion. As is readily apparent, the reflective cover may be made wider than is needed for the desired range of cropping e.g. if it is held slideably on the lid by a screw or equivalent means, penetrating through a central longitudinal slot, provided in the cover in the direction of its motion. The scale of markings, such as numbers or other symbols is advantageously printed on the reflective portion of the lid, with the vicinal edge of the cover serving as pointer or indicator. The cover is made advantageously of very thin material, so as to give the least interference with the composing and focussing of the image.

Instead of cropping just one side of the picture area, one may also provide on the adjustable lid slideable covers on both sides, with the light reflecting area, provided in the center of the lid and the non-reflective areas provided on opposite sides.

The general principle of the adjustable lid may also be readily applied, with suitable modifications, in the making of cropped transparencies by reversal technique, having non-transparent or black borders all around. As described hereinbefore, this is achieved by the use of the opaque masking frame, e.g. one designed to accommodate a large number of 35 mm. transparencies. The adjustable lid is used as before, but supplied for this operation with a set of partial lids of varying sizes, corresponding to the sizes of the non-reflective areas in the various settings of the adjustable lid.

After determining the number of the cropping position on the adjustable lid, as described hereinbefore, the operator removes the adjustable lid with the enlarger shut off and inserts the partial lid in the picture area on the side, where the non-reflective section of the adjustable lid has been in the composition step. Correct positioning of the partial lid is advantageously assured by the use of registering means as described hereinbefore. Thereafter, the operator exposes the cropped picture area and, after removal of the partial lid, he reinserts the standard, full size lid and continues with the exposure of the remaining picture areas. The standard sheet is then removed and processed by the usual reversal techniques, as required for the particular material.

The present invention comprises still another embodiment of the multiexposure easel, which permits direct individual cropping of any one or more of the prints, produced in the easel. This is accomplished by the provision of at least one slideably mounted masking blade in the opaque masking frame.

This embodiment of the multiexposure easel of the invention is of particular benefit, if the easel is to be used with direct printing positive or negative materials for the making of rectangular prints or representations, having variable ratios of lengths to widths, depending on the particular character and requirements of the subject, represented on the prints.

Referring to FIGS. 12 to 14, the easel comprises base 180 and inserted thereon masking frame 181. Masking frame 181 comprises rectangular frame member 182, made up of a pair of edge members 185, a pair of edge members 188 joined at right angles to the latter, and cross bars 183, which in combination define four rectangular picture areas 184 of equal size and shape. Directly to the flat underside of masking frame 181 is removably joined by screws 186 masking grid 187, such that it underlies the inner edges of frame member 182 and cross bars 183. The rectangular openings in the masking grid 187 are slightly smaller than picture areas 184, such that the edges of masking grid 187 project on all sides into the picture area, forming masks along the edges of each picture area of even width, on which the lids rest, when they are inserted into the picture area (not shown). All around frame member 182 is perpendicularly joined in downward direction vertical rim 190, adapted to slide over the edge of base 180, when the masking frame 181 is inserted thereon. Rectangular sheet 191 of light sensitive photographic material is resting on base 180, centered by registering pins 192, which protrude into reversed funnel-like bores 193, provided in the underside of frame member 182, and cooperating with pins 192, so as to register the masking frame relative to base 180 and to sheet 191 of light sensitive photographic material.

Edge members 188 are substantially wider and higher than edge members 185, forming downwardly facing U-channels 194. Each U-channel contains sliding bar 196, coaxially and fixedly mounted in solid end portions 198 adjoining the ends of each of the U-channels. Each of edge members 188 has in its center top portion a rectangular opening 200, through which project prisms 202 and 202a, respectively. Prisms 202 and 202a are slidably set on sliding bars 196 by rectangular groove 204 in their bottom portion. To the bottom of prisms 202 and 202a are joined the ends of masking blade 210, extending across the masking frame and connecting both prisms 202 and 202a. Thumb screws 211 are provided in vertical threaded bores in both prisms 202 and 202a.

Prism 202 has pivotally joined to its vertical side, facing the picture areas 184, over hinge 214, blade shaped cropping aid 212 of a width, corresponding exactly to that of masking blade 210 and exactly superimposed on the latter. Hinge 214 is joined to the vertical side of prism 204 at a height, so that it is outside the U-channel. The pivotally joined end 212a of cropping aid 212 is angled so that it follows closely the contours of edge member 188, extending slideably with its main body horizontally over both picture areas at a height, slightly above cross bars 183 and the inner low portion of the opposite edge member 188.

In the operation of this embodiment of the masking frame the operator places the standard sheet of light sensitive photographic material and the masking frame with all the lids inserted onto the base in register with each other. If he wishes to use any one of the full picture areas, he slides the masking blade 210 out of the way, so as to utilize the picture area unobstructed by the masking blade 210 and cropping aid 212. If he wishes to crop the representation in any one picture area, he loosens thumb screws 212 and adjusts the position of the cropping mask and cropping aid, so as to give him the desired shape and size of the picture area. This may be done while the representation is projected onto the lid, covering the respective picture area. The cropping aid, which is preferably non-reflective or of low reflectance, permits exact cropping of the representation. Thereafter, thumb screws 212 are tightened and after shutting off the enlarger, he removes the lid, and, if necessary, makes the height adjustment of the base. Thereafter, the light sensitive material underlying the picture area is exposed in the usual manner and the lid reinserted.

If desired, the cropping aid may be lifted up out of the way for the duration of the exposure, so as to avoid that the shadow of its edge falls onto the light sensitive sheet, when the exposure is made, resulting in less than a sharp definition of the margin line.

As can be readily seen, the handles provided in the center of the lids (not shown), do not interfere with the lateral movement of the cropping aid, as long as the width of the masking blade and thus of the cropping aid is slightly less than half the width of each of the picture areas. This rule applies, regardless of the absolute size of the picture area in a given masking frame. The masking blade is thus advantageously proportioned, to cover at its maximum setting slightly less than one half of each picture area in a given masking frame, regardless of the absolute size of the individual picture areas.

The cropping aid does normally not interfere with the insertion and removal of the individual lids. However, as stated, the cropping aid may be swung out of the way, if it is desired for convenience or accuracy in making the exposure. If more than four picture areas are provided in the masking frame, it cannot be avoided, that the cropping aid will slide, in the operation of the easel, over the handles of at least some of the inserted lids. Proper proportioning of the height of the handles and of the vertical distance of the cropping aid from the base, avoids undesirable interference.

Instead of providing sliding bars 196 on opposite sides of the masking frame, it is in many cases sufficient, if the masking blade is slidably joined on only one side, its other end being free. Additional freedom in the choice of the size and shape of the cropped picture areas in a given masking frame is provided, if a second masking blade with cooperating cropping aid is slidably provided perpendicularly to the former in the masking frame in analogical manner.

Depending on the construction of the masking frame, it may sometimes be desirable to attach to prism member 202 means, which are adapted to shade the slot-like opening 200. This avoids that light, falling from the enlarger through opening 200, could find its way to the edges of the light sensitive material. However, by proper design of the masking frame and particularly by providing enough overlap of the frame members over the edges of the light sensitive material, detrimental exposure by stray light can be safely avoided without resorting to the just mentioned auxiliary means. The thumb screws 211 may be omitted, if means are provided, which give some friction between prism member 202 and sliding bar 196, so as to prevent inadvertent lateral displacement of masking blade 210 without interfering with the desired lateral adjustment.

Figure 15:
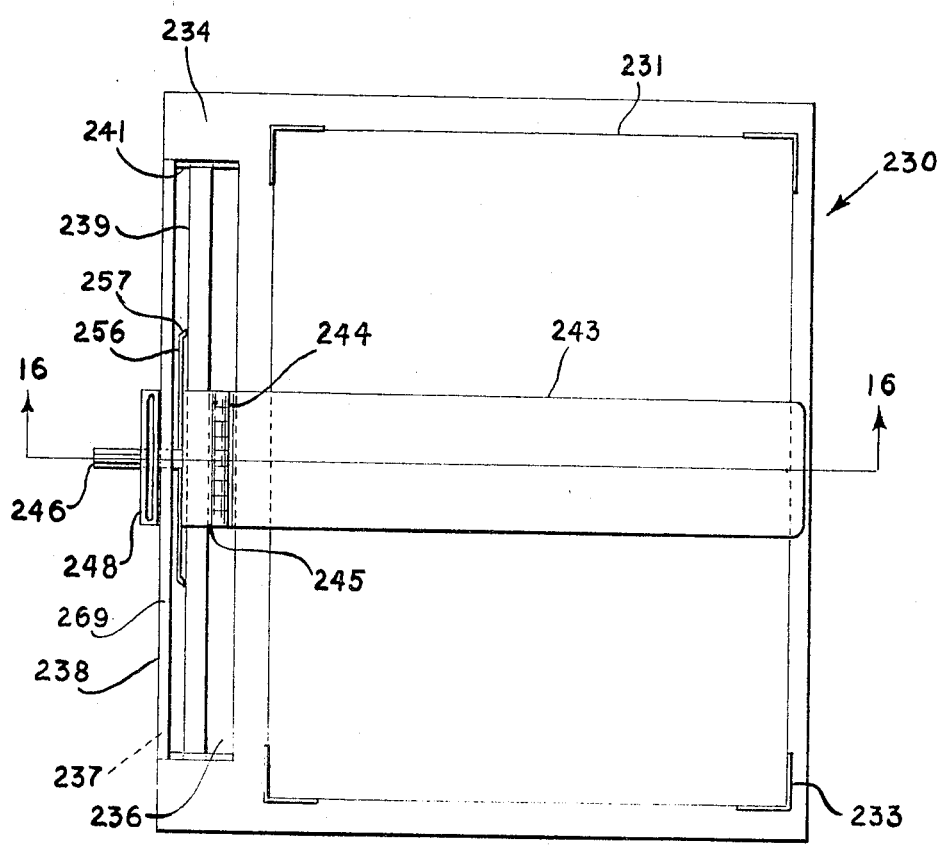
FIG. 15 is a top plan view of another embodiment of the base, useful in the easel of the invention and having means for cropping.
Figure 16:
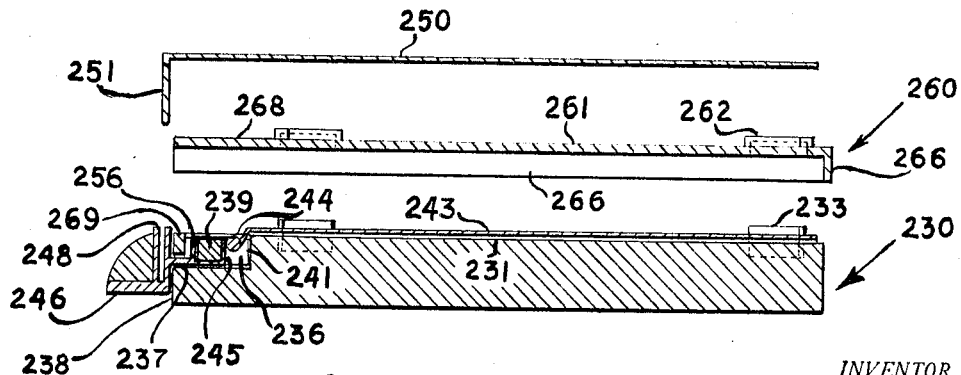
FIG. 16 is a vertical section of the base, taken along line 16—16 in FIG. 15 with vertical sections of a modified masking frame and cropping aid, shown in an exploded view.

Instead of providing the adjustable masking blade or blades in each masking frame, as described hereinbefore, the masking blade or blades may also be permanently or removably provided on the base. An embodiment of the base, containing its own masking means, is depicted in FIGS. 15 and 16 of the accompanying drawings. Rectangular base 230 is adapted to hold a standard sheet 231 of light sensitive photographic material in a predetermined position by the provision of angular centering means 233. Centering means 233 are set in the base in such manner, that their inside edges define a rectangle, having dimensions which snugly accommodate the standard sheet 231, when it is inserted. The rectangle is positioned off center to the right, so as to leave on the left of the base 230 a strip 234, which is not covered by the sheet 231. In said strip 234 of the base is provided rectangular groove 236, extending close to the ends of strip 234. Horizontal slot 237 of a length equal to that of groove 236, connects the bottom section of groove 236 to the outside of vertical edge 238 of base 230, leaving edge member 269 along the top outer edge of base 230. In groove 236 is horizontally mounted rectangular sliding bar 239 by help of plate-like end members 241.

Masking blade 243, made of a very thin material, is joined over hinge 244 to rectangular sleeve 245, which is slidably contained on sliding bar 239. Handle 246 is fixedly joined to sleeve 245, extending through horizontal slot 237 to the outside of base 230. Vertical pocket 248 is joined to the outside portion of handle 246, such that it extends parallel to sleeve 245 along the outside of vertical edge 238 of the base 230. Pocket 248 is adapted to receive removably cropping aid 250 (shown in an exploded view in FIG. 16) by its vertical tongue 251. Cropping aid 250 is a blade of thin material, dimensioned such that it extends over the whole width of the base with its long edges exactly superimposed over the corresponding long edge of the underlying masking blade 243, when it is inserted in pocket 248.

Blade springs 256 are joined to the sleeve 245, such that they exert, with their angled free ends 257, light pressure on the sliding bar 239, so as to permit lateral adjustment of the sleeve, yet providing enough resistance to prevent inadvertent displacement of the sleeve and masking blade during use of the easel.

Masking frame 260 (shown in an exploded vertical sectional view in FIG. 16) is constructed as described hereinbefore, but contains in its edge members 261 angular pockets 262, which are positioned and dimensioned so as to cooperate with angle guides 233 and register the masking frame on the base 230, when the masking frame is inserted, by receiving angle guides 233. Angle guides 233 serve thus in this embodiment of the easel both as centering and as registering means. Vertical rim 266 extends downwardly on three sides only of masking frame 260. Its fourth side 268 having no rim, is horizontally extended so as to cover groove 236, when it is inserted. In this manner the passage of undesirable stray light underneath of the frame to the edges of sheet 231 is safely prevented. Stray light, passing through horizontal slot 237 into groove 236, will usually not reach the edge of the sheet 231. If desired, suitable shade means may be provided along slot 237.

In the use of the easel, the operator lifts masking blade 243 by pivoting it around hinge 244. He then drops the standard sheet 231 of photographic material into the rectangle, defined by angle guards 233, drops masking blade 243 onto the sheet 231 and places masking frame 260 onto the base, such that angle guides 233 register in pockets 262. Thereafter, he inserts the lids into the picture areas of the masking frame (not shown) and inserts tongue 251 of cropping aid 250 into pocket member 248, such that the cropping aid is superimposed upon masking blade 243. The operator then projects the representation to be produced in any one of the picture areas onto the lid and adjusts the cropping aid to the desired lateral position, by moving handle 246 along the edge of the easel. This operation places the masking blade 243, being directly in contact with the top surface of the sheet 231, into the desired cropping position, providing a sharp edge, when the operator exposes the picture area after removal of the cropping aid and of the lid. After replacing the lid and the cropping aid, the operator projects an image onto the next picture area, adjusts the position of the cropping aid, exposes as described hereinbefore and so forth, until all picture areas defined by the masking frame 260, have been exposed. He thereafter removes the sheet 231 for treatment and finishing. If the operator does not wish to crop the pictorial representation in any one of the picture areas, he simply moves the masking strip out of the way to the opposite side of the base, so as to utilize the full picture area. The masking blade may also be mounted removably and can be taken out, if not needed.

Base 230 has been illustrated with the adjustable masking blade, extending across the narrow dimensions of the base. It may also be mounted, such that it extends across the long dimensions of the base. Which of the locations of the masking blade is selected, depends primarily on the arrangement of the picture areas in the masking frames to be used with the base, and on which sides of the picture areas are to be shortened by the cropping device.

Greater versatility is achieved, if the base is provided with a second slideable masking blade, mounted perpendicularly to masking blade 243 by the provision of a sliding bar arrangement in a groove, comprised along one of the adjoining narrow sides of base 230. This additional masking blade may likewise be provided with a superimposed cropping aid, as described hereinbefore. One or both of the cooperating masking blades may be removable. Any one of them may then be used, depending on the orientation of the picture areas in the masking frame, and depending on which side of the picture area the operator wishes to crop. As is readily apparent, using both masking blades in combination, gives the greatest versatility by permitting cropping on two vicinary sides of the picture area.

If desired, the second end of the masking blade may also be joined to a sleeve slideably contained on a second sliding bar, provided parallel to the first on the opposite edge of the base. The register of the masking frame may be further improved by the provision of additional registering means, and any other suitable centering means may be substituted for the angle guides 233, illustrated in FIGS. 15 and 16. The base may also be provided with means, permitting height adjustability as described hereinbefore, so as to compensate for the height differential between the top surface of the lids and of the sheet of photographic material.

Cropping aid 250 may advantageously be connected to tongue 251 over a hinge, which permits pivotally lifting the cropping aid from the base and lowering it into the horizontal position for the actual cropping operation, without requiring its removal from the pocket.

The masking frame has been described hereinbefore as having a vertical rim, extending downward from its edges. Instead of providing the rim on the masking frame, a rim may be joined to the base extending vertically upward, forming a recess into which the light sensitive photographic sheet material and the masking frame are inserted. Additional protection against stray light, passing through the joint between the rim and the edge of the masking frame, is achieved by the optional provision of a horizontal rim and flange on the masking frame, which overlaps the base-mounted rim.

The edges of the lids may likewise be provided with light protective rims or other means, serving the same purpose, provided they do not interfere with the accurate seating and with the ready insertion and removal of the lids.

The means provided for the controlled height adjustment of the base may be modified, so as to permit the adjustment or change of the height differential, if this is desired. This may be achieved, for instance, in the embodiment of the base, illustrated in FIGS. 6 and 7, by turning discs 106 in the bore 110. Turning the disc deeper into the bore, will reduce the height differential and turning it in the opposite direction, will increase the height differential, achieved by the actuation of the handle. Suitably adapted auxiliary means permit also the other embodiments of the means for height adjustability to be modified for the changing of the height differential, so as to permit the calibration of the base and its adjustment to the particular masking frame and lids to be used with the base.

The masking frame may be made from any suitable material such as metal or plastics. It may be made by extrusion or stamping methods known per se. The use of thermoplastic materials in sheet form as the construction material permits the production of the masking frame by inexpensive vacuum-forming methods. The profile of the complete embodiment of the masking frame may be readily and exactly produced by these methods, by the use of suitable male or female molds. The picture areas are provided by subsequent cutting or stamping along the edge, outlined by the picture area or by the provision of cutting tools in the male or female molds. The use of these materials and of this method permits the inexpensive mass production of the masking frame. In order to be independent of variations and irregularities in the shrinkage of the masking frame, produced by this method, one may employ with advantage with the masking frame the hereinbefore described separate grid or pattern of masks, which is advantageously removably attached to the underside of the masking frame.

The invention has been described hereinbefore and illustrated by physical embodiments of the apparatus and device. The new methods of exposing light sensitive photographic sheet materials, so as to produce a multiplicity of prints on a common sheet and the novel process of producing prints, having white or transparent margins or borders or tranparencies, having black or light impervious or opaque margins or borders, with or without cropping of the individual prints, are likewise part of this invention.

As many apparently widely different embodiments of this invention may be made without departing from the spirit and scope thereof, it is understood, that the invention is not limited to the specific embodiments thereof, except as defined in the appended claims.

I claim:
1. A multiexposure easel comprising a base for the reception of a standard size sheet of light sensitive photographic material and removably set on said base a masking frame which masking frame comprises an outer frame and which masking frame is subdivided into at least two separate picture areas by at least one crossbar joined to said outer frame, said picture areas being removably fitted with light impervious cover means, which cover means comprise on their top side a reflective area of a size, shape and location corresponding approximately to the underlying picture area, and said reflective area being surrounded by a non-reflective border, said cover means being set into the picture areas in substantially light tight fashion, so as to protect the sheet from the access of light when said cover means are inserted in the picture areas, said easel producing a multiplicity of individual prints by successive exposures on said standard sheet of photographic material, such that each individual print is, after cutting, surrounded by a full white border.

2. The masking frame of claim 1 in which the frame and cross bar members are pervious to light.

3. A masking frame, for use in a photographic easel, comprising an outer frame member and at least one crossbar member defining a multiplicity of picture areas, said frame member and crossbar members being pervious to light, in combination with at least one opaque standard lid for each picture area, which lids are adapted to be removably inserted in said picture areas, so as to provide a substantially light tight cover, shielding the areas underlying said lids from direct light falling onto the masking frame.

4. The masking frame of claim 3 which comprises in addition an adjustable lid and a set of auxiliary lids, adapted to be removably inserted in the picture areas in lieu of the said standard lids.

5. The easel of claim 3 in which the lids comprise means made of a material which is pervious to light, which means are adapted to removably secure the lids in the masking frame such that the masking frame with the inserted lids form a unit.

6. The easel of claim 3 which comprises at least one set of auxiliary lids having an opaque area of differing sizes yet smaller than that of the said standard opaque lid, which auxiliary lids are adapted to be removably inserted in the picture areas in lieu of the said standard lids.

7. A masking frame as defined in claim 6 which comprises in addition at least one adjustable lid, which is adapted to be removably inserted in any one of the picture areas of the masking frame and which comprises means permitting to alter the size of the reflective area, without changing the opaqueness of the lid such that the adjustable lid serves to compose projected images of varying length-width ratios on the adjustable lid.

8. A multiexposure easel comprising a base for the reception of a standard size sheet of light sensitive photographic material and removably set on said base a masking frame which comprises an outer frame and which is subdivided into at least two separate picture areas by at least one cross bar joined to said outer frame, each picture area comprising a thin border mask projecting into and surrounding each picture area in the bottom plane of the masking frame outlining a useable picture area of a size smaller than the said picture area, said picture areas being removably fitted with light impervious cover means, which cover means comprise a reflective top side of a size, shape and location corresponding to the underlying useable picture area defined by said border mask, said cover means being set into the picture areas in substantially light tight fashion, so as to protect the sheet from the access of light when the said cover means are inserted in the picture areas, said easel producing a multiplicity of individual prints by successive exposures on said standard sheet of photographic material, such that each individual print on direct printing paper is after cutting, individually surrounded by a full white border.

9. A multiexposure easel as defined in claim 8, in which all picture areas are of identical size and shape.

10. A multiexposure easel as defined in claim 8, which contains means adapted to permit cropping of each picture area.

11. The easel of claim 8 in which the masking frame is made from a light impervious material.

12. The easel of claim 11 in which the lower portions of the frame members surrounding each picture area are extended into the picture area so as to form said border mask and providing a support for the said cover means.

13. The easel of claim 11 in which said border masks are separate members which are fastened to the frame members.

14. The easel of claim 11 in which said border masks are provided in each picture area by a masking grid which is fastened removably to the underside of the masking frame.

15. The easel of claim 14 which is provided with a multiplicity of exchangeable masking grids each outlining useable picture areas of differing sizes so as to provide in the final prints borders of differing width.

16. The easel of claim 11 in which the masking frame comprises at least one laterally adjustable masking blade in a position below the lids, which masking blade is adapted to cover, by lateral displacement an edge portion of any one of the useable picture areas.

17. The easel of claim 16 which comprises in addition and superimposed on said masking blade a cropping blade of a size and shape approximately corresponding to those of the masking blade, said cropping blade being removably mounted in a plane lying above said lids and masking frame.

18. The easel of claim 11 in which the base comprises at least one laterally adjustable masking blade in a position above the top of the base, which masking blade is adapted to cover, by lateral displacement, an edge portion of any one of the useable picture areas.

19. A multiexposure easel as defined in claim 18, in which a cropping aid is removably superimposed on each masking blade in a position above the masking frame and lids contained therein.

20. The easel of claim 18 which comprises in addition and superimposed on said masking blade a cropping blade of a size and shape approximately corresponding to those of the masking blade, said cropping blade being removably mounted in a plane lying above said lids and masking frame.

21. The easel of claim 20 which comprises a second pair of masking and cropping blades which are oriented and laterally adjustable in a direction perpendicular to the first pair of masking and cropping blades.

22. The easel of claim 8, in which the masking frame is made of a material which is pervious to light permitting the passage of light through said masking frame but not through said cover means.

23. The easel of claim 8 in which the masking frame comprises a rim, which extends downwardly around the outer edge of the frame member of said masking frame and which extends over the upper portion of said base when the masking frame is inserted on the base in operating position.

24. The easel of claim 8 in which the base comprises pin shaped registering means for the photographic standard sheet and for the masking frame.

25. The easel of claim 8 in which the said cover means is a lid which has mounted on its top side a pivotable handle.

26. The easel of claim 25 in which the pivotable handles in a series of lids making up a complete set in a masking frame, are consecutively numbered.

27. The easel of claim 8 in which the base comprises registering means for the photographic sheet material.

28. The easel of claim 8 in which the base is provided with means for vertical height adjustment, so as to permit maintenance of accurate focus for the actual exposure of the image initially focussed on the reflective lid.

29. The easel of claim 28 which comprises a heavy horizontal frame surrounding the base, which is provided with vertical slots into which engage vertically movably horizontal pins which are provided at the edges of the base, and means which are adapted to fixedly arrest the base in a high and in a low position defined by the upper and lower edges of said vertical slots, the difference in height of the high and the low position corresponding to the thickness of the lids used in the masking frame.

30. A masking frame for use in a multiexposure photographic easel comprising an outer rectangular frame member and at least one cross bar member joined to said frame member so as to define a multiplicity of individual picture areas, each picture area comprising a thin border mask projecting into and surrounding each picture area in the bottom plane of the masking frame, outlining a useable picture area of a size smaller than the said picture area, said picture areas being removably fitted with light impervious cover means, which cover means comprise on their top side a reflective area of a size, shape and location corresponding to the underlying useable picture area as defined by said border mask, said cover means being otherwise non-reflective and being set into the picture areas in substantially light tight fashion.

31. A multiexposure photographic easel comprising a base and superimposed thereon, a masking frame containing a multiplicity of individual picture areas, each of which picture areas is removably fitted with a lid, said base being provided with means for vertical height adjustment, so as to permit maintenance of accurate focus for the actual exposure of the image initially focussed on the reflective lid, at least one of the lids comprising on its exposed face a defined reflective area which has dimensions and a shape substantially identical to those of the underlying useable picture area and which is located and oriented such that it is approximately superimposed on the underlying useable picture area when the lid is inserted in operating position in the masking frame, said easel being adapted to produce a multiplicity of prints on a common sheet of light sensitive photographic material, such that each print is individually surrounded by a full white border.

References Cited by the Examiner
UNITED STATES PATENTS

| | | | |
|---|---|---|---|
| 1,817,606 | 8/1931 | Bern | 88—24 |
| 1,893,156 | 1/1933 | Bern | 88—24 |
| 2,432,040 | 12/1947 | Raiff et al. | 88—24 |
| 2,454,032 | 11/1948 | Boulais | 88—24 |
| 2,895,377 | 7/1959 | Manning | 88—24 |
| 3,139,791 | 7/1964 | Bailey et al. | 88—24 |

NORTON ANSHER, *Primary Examiner.*

RICHARD A. WINTERCORN, *Assistant Examiner.*